United States Patent
Li et al.

(10) Patent No.: US 11,509,551 B2
(45) Date of Patent: Nov. 22, 2022

(54) MONITORING SPECTRAL EFFICIENCY

(71) Applicant: NetScout Systems Texas, LLC, Plano, TX (US)

(72) Inventors: Zheng Bin Li, Dublin, CA (US); Wing Lo, Plano, TX (US)

(73) Assignee: NetScout Systems Texas, LLC, Plano, TX (US)

(*) Notice: Subject to any disclaimer, the term of this patent is extended or adjusted under 35 U.S.C. 154(b) by 160 days.

(21) Appl. No.: 16/121,540

(22) Filed: Sep. 4, 2018

(65) Prior Publication Data
US 2020/0076711 A1 Mar. 5, 2020

(51) Int. Cl.
*H04W 16/00* (2009.01)
*H04L 43/045* (2022.01)
*H04W 16/18* (2009.01)
*H04L 43/16* (2022.01)

(52) U.S. Cl.
CPC ............ *H04L 43/045* (2013.01); *H04L 43/16* (2013.01); *H04W 16/18* (2013.01)

(58) Field of Classification Search
CPC ..... H04W 16/24; H04W 4/043; H04W 4/021; H04W 4/33
See application file for complete search history.

(56) References Cited

U.S. PATENT DOCUMENTS

| | | | | |
|---|---|---|---|---|
| 2007/0165663 | A1* | 7/2007 | Aloni | H04L 49/352 370/420 |
| 2015/0063151 | A1* | 3/2015 | Sadek | H04W 24/08 370/252 |
| 2015/0085794 | A1* | 3/2015 | Chen | H04L 5/0092 370/329 |
| 2016/0087752 | A1* | 3/2016 | Xia | H04L 1/0003 370/329 |
| 2017/0055281 | A1* | 2/2017 | Islam | H04W 72/1289 |
| 2017/0061655 | A1* | 3/2017 | Pylappan | G01C 21/20 |
| 2017/0149461 | A1* | 5/2017 | Han | H04M 9/082 |
| 2017/0234562 | A1* | 8/2017 | Ribbich | G05D 23/1934 700/277 |
| 2018/0249487 | A1* | 8/2018 | Takeda | H04L 5/0044 |
| 2019/0097747 | A1* | 3/2019 | Kim | H04J 14/0278 |
| 2019/0246292 | A1* | 8/2019 | Shekalim | H04W 24/02 |
| 2019/0268779 | A1* | 8/2019 | Peroulas | H04W 48/16 |
| 2020/0084766 | A1* | 3/2020 | Pawlak | H04W 72/0446 |
| 2021/0119881 | A1* | 4/2021 | Shirazipour | H04W 28/08 |

* cited by examiner

*Primary Examiner* — Abdelillah Elmejjarmi
(74) *Attorney, Agent, or Firm* — Locke Lord LLP; Scott D. Wofsy; Christopher J. Capelli

(57) ABSTRACT

A method for monitoring spectral efficiency in a wireless network includes determining total number of resource blocks or resource elements allocated for each of one or more calls in the wireless network during a given time period and determining a corresponding total number of bits transmitted for each of the one or more calls during the given time period.

A spectral efficiency metric is calculated for each of the one or more calls based at least in part on the total number of bits transmitted during the given time period and the total number of resource blocks or resource elements allocated for transmission during the given time period. A heat map for each of the one or more calls is generated based on geographic locations of the one or more calls.

18 Claims, 7 Drawing Sheets

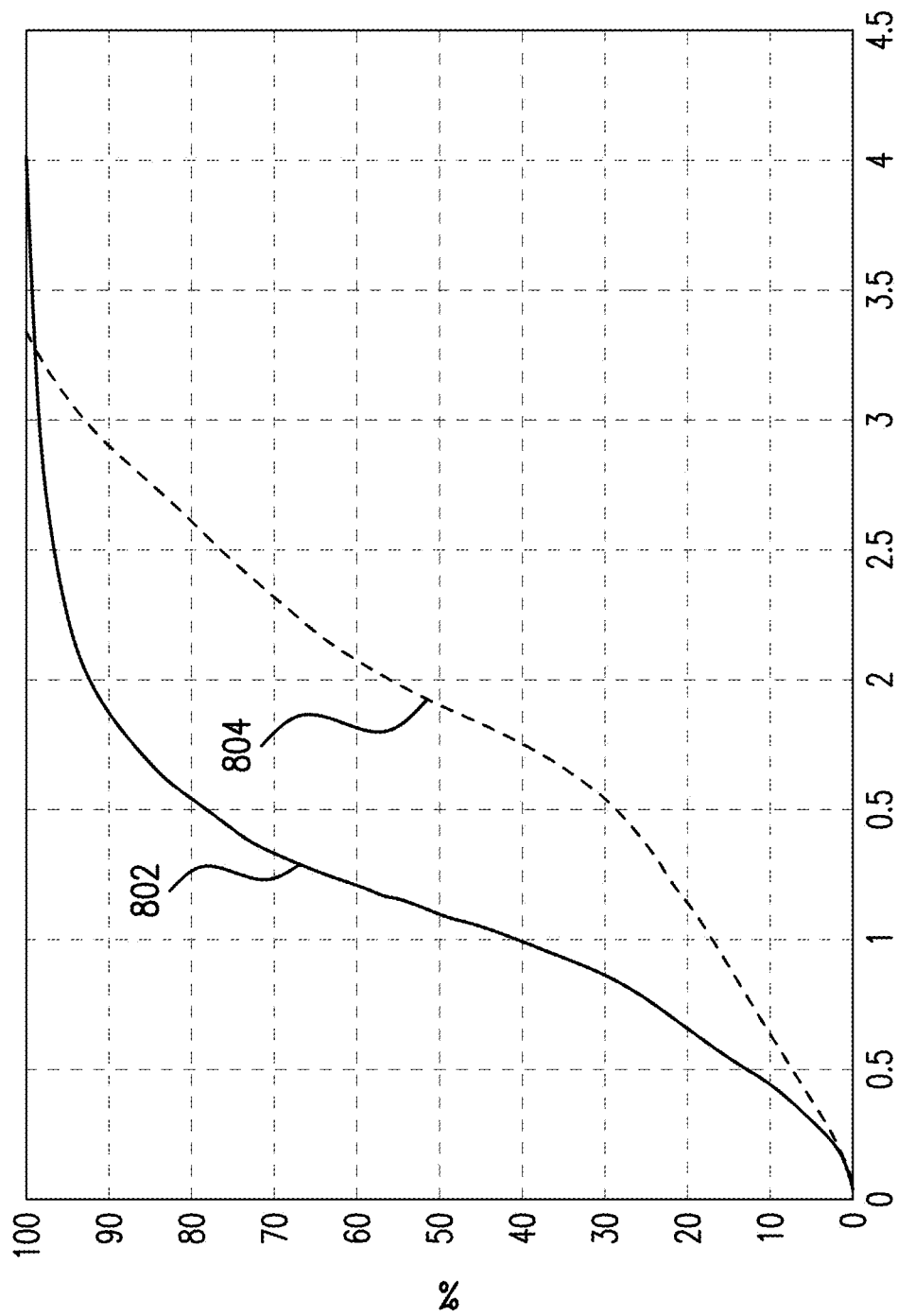

MONITORING SPECTRAL EFFICIENCY

FIELD OF THE INVENTION

Embodiments of the present invention relate generally to wireless communications, and specifically to monitoring spectral efficiency in wireless networks.

BACKGROUND OF THE INVENTION

As the use of wireless devices continues to increase, the need for high-quality communication between wireless devices, and more particularly within entire networks of such devices becomes increasingly critical. Although it is difficult to predict and regulate the data rate of an entire network of radio devices, one important factor is the quality of each individual link. The type and performance parameters for each device in the network may contribute to the overall efficiency of the network. Thus, it may be important for a network administrator/installer to monitor the overall network in a manner that allows the quick and easy understanding of multiple performance metrics. Further, tools and methods of monitoring a network that simulate the performance (or changes in performance) and operation of the network or portions of the network over time would be particularly helpful. Graphical maps illustrating (in a cogent manner) all or relevant portions of a network may be particularly helpful.

The ability to monitor spectral efficiency in live networks would significantly expedite root cause determination and would be advantageous to any wireless network monitoring solution.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for monitoring spectral efficiency in a wireless network includes determining total number of resource blocks or resource elements allocated for each of one or more calls in the wireless network during a given time period and determining a corresponding total number of bits transmitted for each of the one or more calls during the given time period.

A spectral efficiency metric is calculated for each of the one or more calls based at least in part on the total number of bits transmitted during the given time period and the total number of resource blocks or resource elements allocated for transmission during the given time period. A heat map for each of the one or more calls is generated based on geographic locations of the one or more calls.

In another aspect, a system for monitoring spectral efficiency in a wireless network includes a processor and a memory device coupled to the processor. The memory device contains a set of instructions that, when executed by the processor, cause the processor to determine total number of resource blocks or resource elements allocated for each of one or more calls in the wireless network during a given time period and to determine a corresponding total number of bits transmitted for each of the one or more calls during the given time periods. The set of instructions, when executed by the processor, further cause the processor to calculate a spectral efficiency metric for each of the one or more calls based at least in part on the total number of bits transmitted during the given time period and the total number of resource blocks or resource elements allocated for transmission during the given time period. The set of instructions, when executed by the processor, also cause the processor to generate a heat map for each of the one or more calls based on geographic locations of the one or more calls.

BRIEF DESCRIPTION OF THE DRAWINGS

The accompanying appendices and/or drawings illustrate various, non-limiting, examples, inventive aspects in accordance with the present disclosure:

FIG. 8 is a diagram illustrating an example of cumulative distribution function CDF of base station's spectral efficiency in accordance with an embodiment of the present invention.

DETAILED DESCRIPTION OF CERTAIN EMBODIMENTS

Figure 1:
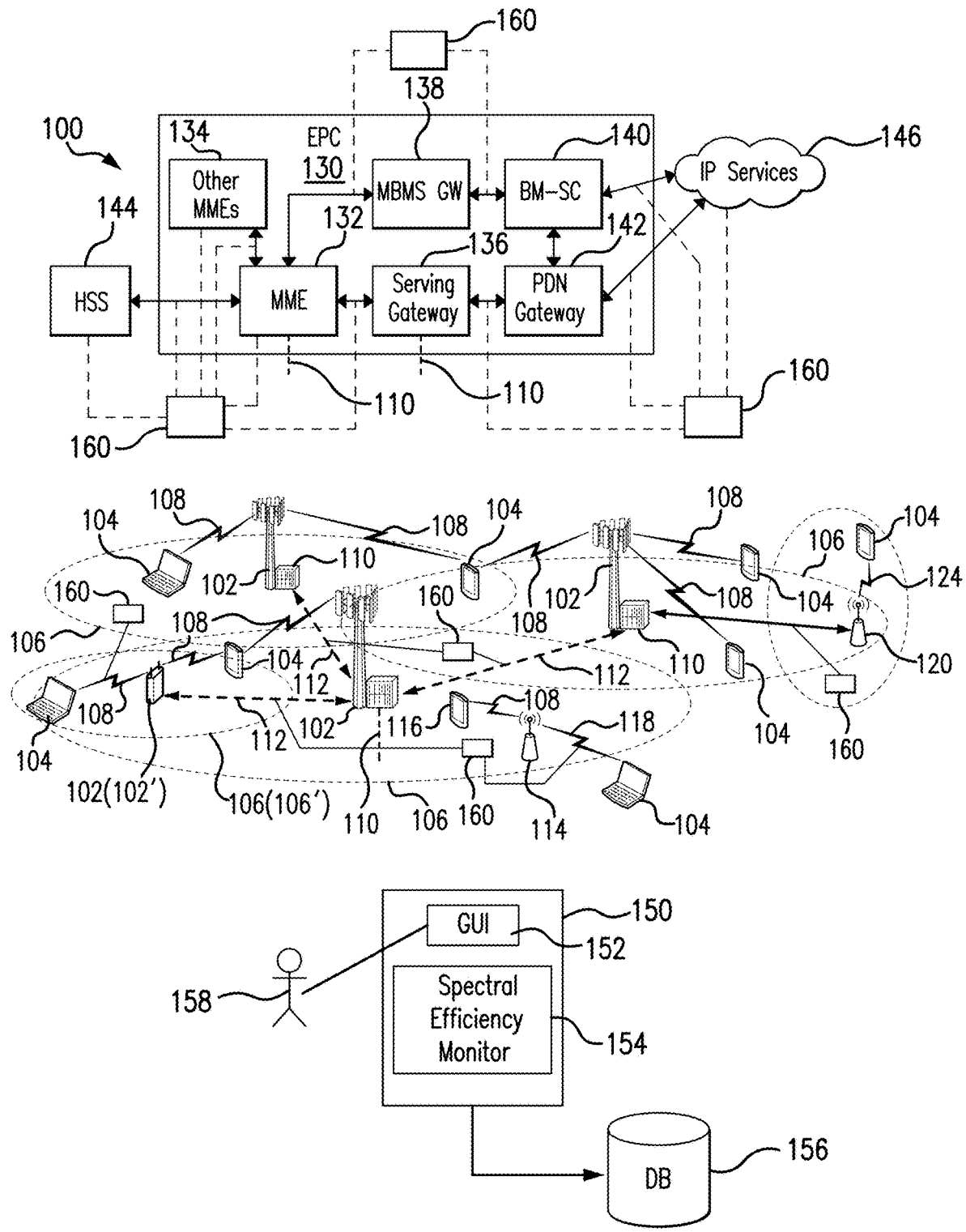
FIG. 1 illustrates an example communication network in accordance with an illustrated embodiment.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Several aspects of telecommunication systems will now be presented with reference to various apparatus and methods. These apparatus and methods will be described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various embodiments of the present invention disclose a network monitoring and troubleshooting solution that calculates spectral efficiency of uplink and downlink signals for each session/call of interest. Advantageously, the disclosed network monitoring and troubleshooting system generates one or more spectral efficiency maps based on user-specified criteria. In addition, such tool may generate a variety of reports and graphs (e.g., time series graph) based on calculated spectral efficiency. As another advantage, embodiments of the present invention provide a solution to expediting root cause determination in any wireless network by monitoring spectral efficiency in live networks. In some embodiments, the disclosed troubleshooting system may automatically implement one or more preventive and/or remedial steps based on the performed spectral efficiency analysis.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 130. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 130 through backhaul links 110 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 130) with each other over backhaul links 112 (e.g., X2 interface). The backhaul links 112 may be wired or wireless.

The base stations 102 may wirelessly communicate with the UEs 104. Each of the base stations 102 may provide communication coverage for a respective geographic coverage area 106. There may be overlapping geographic coverage areas 106. For example, the small cell 102' may have a coverage area 106' that overlaps the coverage area 106 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 108 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 108 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 114 in communication with Wi-Fi stations (STAs) 116 via communication links 118 in a 5 GHz unlicensed frequency spectrum. When communicating in an unlicensed frequency spectrum, the STAs 116/AP 114 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 114. The small cell 102', employing NR in an unlicensed frequency spectrum, may boost coverage to and/or increase capacity of the access network.

The gNodeB (gNB) 120 may operate in millimeter wave (mmW) frequencies and/or near mmW frequencies in communication with the UE 104. When the gNB 120 operates in mmW or near mmW frequencies, the gNB 120 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 120 may utilize beamforming 124 with the UE 104 to compensate for the extremely high path loss and short range.

The EPC 130 may include a Mobility Management Entity (MME) 132, other MMEs 134, a Serving Gateway 136, a Multimedia Broadcast Multicast Service (MBMS) Gateway 138, a Broadcast Multicast Service Center (BM-SC) 140, and a Packet Data Network (PDN) Gateway 142. The MME 132 may be in communication with a Home Subscriber Server (HSS) 144. The MME 132 is the control node that processes the signaling between the UEs 104 and the EPC 130. Generally, the MME 132 provides bearer and connection management. All user Internet protocol (IP) packets are transferred through the Serving Gateway 136, which itself is connected to the PDN Gateway 142. The PDN Gateway 142 provides UE IP address allocation as well as other functions. The PDN Gateway 142 and the BM-SC 140 are connected to the IP Services 146. The IP Services 146 may include the Internet, an intranet, an IP Multimedia Subsystem (IMS), a PS Streaming Service (PSS), and/or other IP services. The BM-SC 140 may provide functions for MBMS user service provisioning and delivery. The BM-SC 140 may serve as an entry point for content provider MBMS transmission, may be used to authorize and initiate MBMS Bearer Services within a public land mobile network (PLMN), and may be used to schedule MBMS transmissions. The MBMS Gateway 138 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNodeB), an access point, a base transceiver station, a radio base station, a radio transceiver, a transceiver function, a basic service set (BSS), an extended service set (ESS), or some other suitable terminology. The base station 102 provides an access point to the EPC 130 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Advantageously, various embodiments of the present invention contemplate a monitoring and troubleshooting system that efficiently and accurately evaluates signaling, performance and configuration data of both EPC 130 and RAN to present accurate representation of various sessions as they happen in the network.

In the illustrated embodiment, a monitoring tool is implemented as a network probe 160. The network probe 160 may be configured as hardware, software, firmware, or combination thereof, for monitoring data transmission through a variety of network interfaces. Generally, the network probe 160 may be deployed at any of a variety of locations or links of the access network 100 to collect network data packets. The network probe 160 may be configured as a special purpose computing device or a software component (not limited to a single process) dedicated to monitoring data communicated via the access network 100. Alternatively, the network probe 160 may be a general purpose computing device with specialized software components installed thereon. In one embodiment, the network probe 160 is a nGenius InfiniStream, available from NetScout Systems, Inc. of Westford, Mass.

In this example, after collecting the packets (user plane and control plane), the network probe 160 selectively generates session, call, or data records. A session, call, or data record is created for each UE 104 using messages, signals, and/or data collected or intercepted by monitoring probes 160 from various network interfaces. A plurality of monitoring probes 160 may be coupled to interfaces and links in the access network 100 to passively monitor and collect signaling data from one or more interfaces in the network. The monitoring probes 160 may collect user plane and control plane data from the interfaces. The monitoring probes 160, may comprise, for example, one or more processors running one or more software applications that collect, correlate and analyze Protocol Data Units (PDU) and data packets from both RAN and EPC 130 network interfaces and links. All collected data may be stored in a database. Another example of signaling data collected from the access network 100 would be to obtain switching and routing table information or subscribers IP trace route information using well-known real time processing programs such as rtTrace.

As shown in FIG. 1, the troubleshooting system 150 may comprise, or otherwise may cooperate with a spectral efficiency monitor 154. The spectral efficiency monitor 154 may comprise program instructions stored on one or more computer-readable storage devices, which may include internal storage on the troubleshooting system 150. The spectral efficiency monitor 154 provides a comprehensive tool for estimating spectral efficiency for both UL and DL signals within the used orthogonal frequency division multiplexing (OFDM) band for the given transmission system.

In an embodiment, the spectral efficiency monitor 154 may also utilize a user interface to show a user one or more graphical representations of estimated spectral efficiency as described below. Throughout the following discussion, exemplary embodiments of this invention will be directed toward the OFDM based wireless networks. However, it is to be appreciated embodiments of the present invention are applicable to other radio communication systems including, but not limited to, 5G systems, where multiple mobile terminals communicate with a base station using highly dynamic time/frequency resource assignment with coding and modulation control from a single control point, like a base station.

In other words, as noted above, the troubleshooting system 150 may include a user interface, such as graphical user interface (GUI) 152 program. In one embodiment, GUI 152 may comprise a framework for collecting user input, such as geographic region of interest and/or a time period of interest for which spectral efficiency should be calculated. This obtained spectral efficiency may be incorporated into a troubleshooting process to provide more accurate root cause determination as described in more detail below.

Further, according to an embodiment of the present invention all session/call/data related details are captured and stored in a database 156 in the form of metadata, for example. The troubleshooting system 150 populates database records with metadata and has a provision for hashing of this data.

Figure 2:
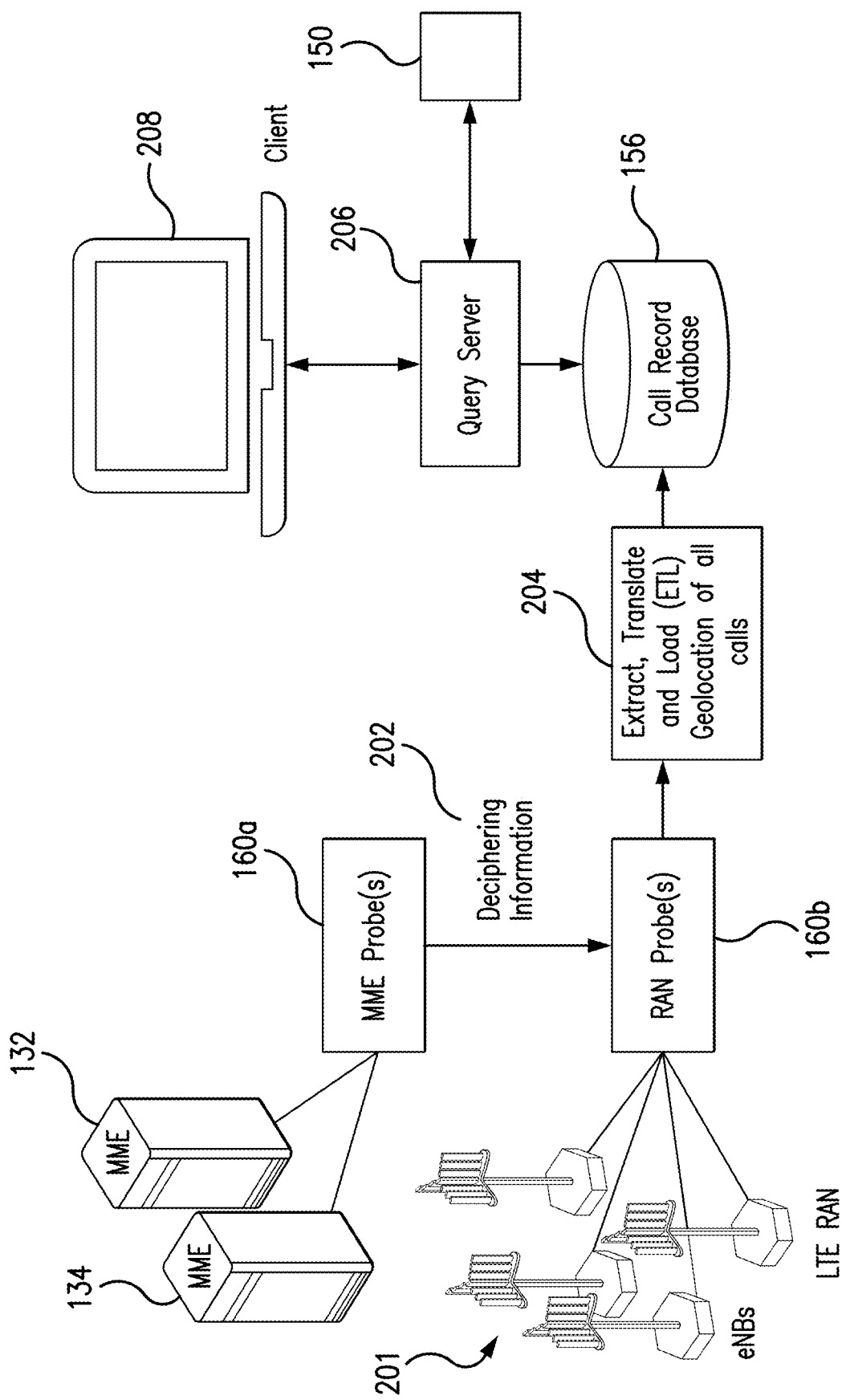
FIG. 2 illustrates more detailed architecture of network monitoring system in the communication network shown in FIG. 1.

FIG. 2 illustrates more detailed architecture of network monitoring tools in the communication network shown in FIG. 1. The diagram in FIG. 2 includes one or more probe interfaces.

Uu air interface allows UE 104 to communicate with the base station 102 using Radio Resource Control (RRC) protocol. Above the RRC layer is an Evolved Packet System (EPS) Non-Access Stratum (NAS) layer protocol, which is carried all the way to MME 132. S1 is a standardized interface between base stations 104 and EPC 130. S1 has two forms: S1-MME for exchange of signaling messages between the base stations 102 and MMEs 132, and S1-U for the transport of user datagrams between base station 104 and SGW 136. S1-MME is an interface by which the base station 102 communicates with the MME 132 using the S1-AP protocol with the EPS NAS Layer protocol on top of S1-AP. S1-MME interface uses Stream Control Transmission Protocol (SCTP) transport, and may be directly monitored. In addition, the EPS NAS layer, which is ciphered in production networks, may be deciphered by the monitoring system if the keys from the S6a interface (not shown) are monitored. MME probe 160a may be coupled to the nodes or links in the wireless network (e.g., LTE network) to passively monitor and collect signaling data from the network. MME probe 160a may then generate Session Records and Data Records containing S1-AP signaling information.

Still referring to FIG. 2, MME probe 160a may be configured to capture packets, messages, and/or other signaling information from interfaces such as, for example, S1-MME. The MME probe 160a is coupled to troubleshooting system 150, which may be configured to correlate events of interest related to different components of EPC 130, such as, but not limited to MME 132, SGW 136.

According to an embodiment of the present invention, the MME probes 160a may send the deciphering information 202 (e.g., keys) to one or more RAN probes 160b. RAN probes 160b passively monitor RAN 201 to gather call/data/media session information and RAN performance indicators. Example RAN probes are provided by NetScout Systems, Inc. of Westford, Mass. RAN probes 160b are configured to passively gather, for example, RAN performance indicators such as dropped packets, dropped calls, throughput, UE power headroom, and the like. In a UMTS/UTRAN network, for example, the RAN probe 160b would monitor RAN activity on the Iub interface between the eNodeB and a radio network controller (RNC). In an embodiment of the present invention, RAN probes 160b are configured to transmit collected data records containing call information to a data repository (e.g., call record database 156). In an embodiment, call data records are transmitted to the data repository using a UDP protocol.

As noted above, the monitoring system shown in FIG. 2 can also include one or more call data record repositories or databases. For example, the call record database 156 can be local to the troubleshooting system 150. In some implementations, the call record databases 156 can be remote to the troubleshooting system 150 but can communicate with the troubleshooting system 150 via a query server 206, for example. With step 204 shown in FIG. 2, the collected call data, including geolocation data, may be Extracted, Translated and Loaded (ETL) into the call record database 156 by the RAN probes 160b. The exact availability of call data may vary, for example with the time of day. At very quiet periods such as at night, call data may be available almost instantaneously.

In some embodiments, the query server 206 is in communication with a client device 208, via a communication module (not shown in FIG. 2). The query server 206 can receive messages from, and send messages to, both the client computer 208 and troubleshooting system 150. In various embodiments, the client device 208 and/or troubleshooting system 150 can send both asynchronous and synchronous requests to the query server 206.

Figure 3:
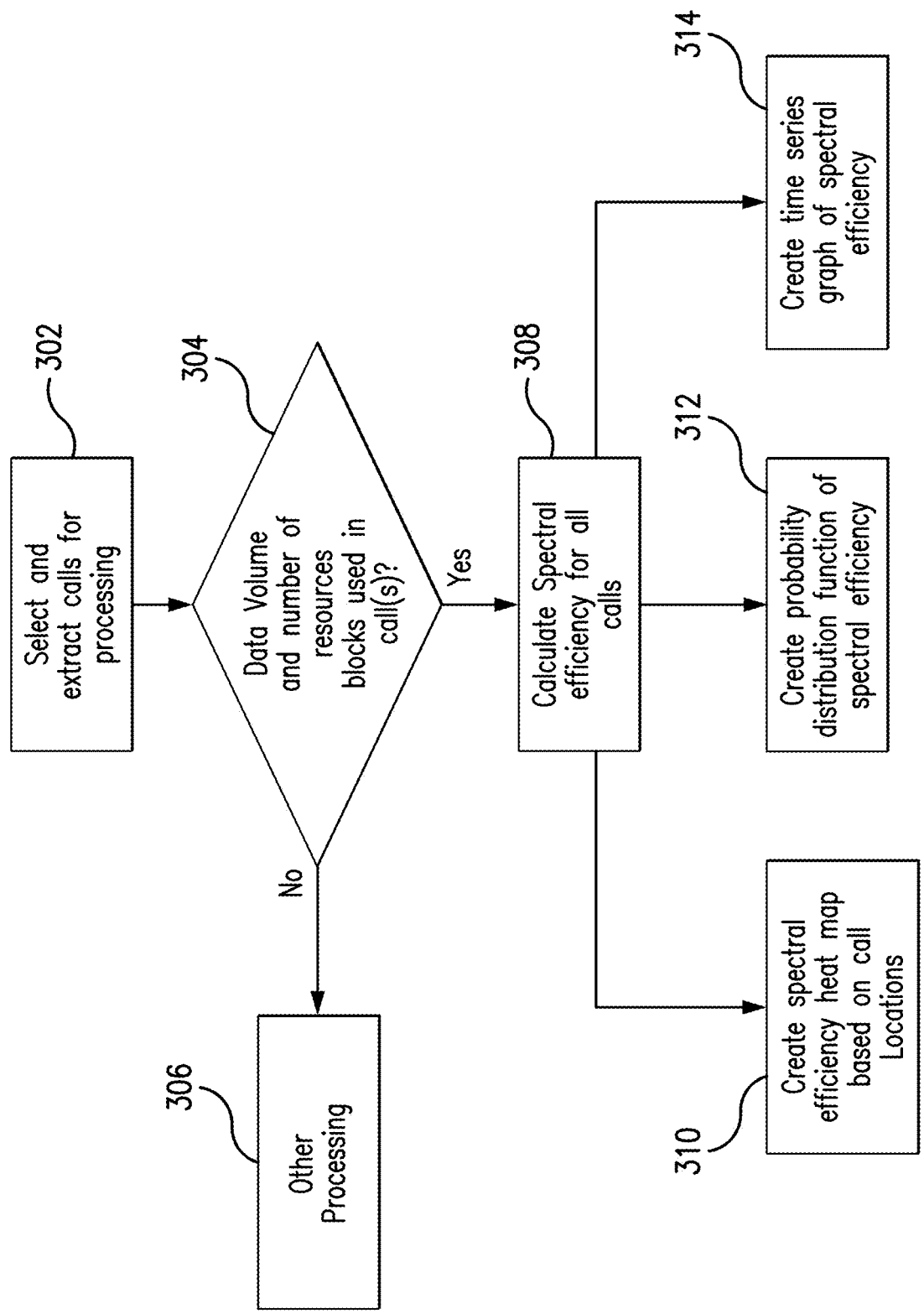
FIG. 3 is a flowchart illustrating operation of an embodiment of the present invention.

FIG. 3 is a flowchart illustrating operation of an embodiment of the present invention. Before turning to description of FIG. 3, it is noted that the flow diagram shown therein is described, by way of example, with reference to steps and/or elements shown in FIGS. 1-2 and 4-7 although these operational steps may be carried out in any system and are not limited to the scenario shown in the aforementioned figure. Additionally, the flow diagram in FIG. 3 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

According to an embodiment of the present invention, at step 302, the spectral efficiency monitor 154 hosted by the troubleshooting system 150 selects and extracts call data for processing using the query server 206. As noted above, such call data may be aggregated by a plurality of probes 160, which in turn may be stored in the call record database 156. Optionally, the spectral efficiency monitor 154 may specify data selection criteria, such as, but not limited to, geographic area of interest, time period of interest, etc. Next, the spectral efficiency monitor 154 or another suitable module of the troubleshooting system 150 may determine total number of resource blocks or resource elements allocated for each of one or more calls in the wireless network during a given time period and may determine a corresponding total number of bits transmitted for each of the one or more calls during the given time period.

At step 304, the spectral efficiency monitor 154 may identify one or more calls of interest and may determine whether transmitted call data volume and a number of resource blocks used in the identified call(s) is known. In response to determining that the transmitted data volume and/or the number of resource blocks used in the call(s) of interest is/are unknown (decision block 304, "No" branch) the spectral efficiency monitor 154 may send a request to another module hosted by the troubleshooting system 150 to perform additional processing at step 306.

In response to determining that the transmitted data volume and the number of resource blocks used in the call(s) of interest is/are known (decision block 304, "Yes" branch), the spectral efficiency monitor 154 calculates spectral efficiency for all calls of interest at step 308. In a variety of wireless networks, such as LTE, a set of physical resource blocks (PRBs) is allocated by the base station (eNodeB) to carry uplink/downlink user data information and uplink/downlink control information. The spectral efficiency monitor 154 is designed to calculate spectral efficiency in both uplink and downlink signals, based on, at least in part, transmitted data volume and based on a number of allocated physical resource elements or PRBs. In various embodiments, the spectral efficiency monitor 154 enables wireless network operators to optimize the wireless spectrum utilization efficiency by detecting low spectrum utilization due to wireless network coverage or signal interference problems, for example.

The spectral efficiency monitor 154 calculates the spectral efficiency for each network component (element, device, and the like) so that network operators can investigate issues at network component levels. Advantageously, the spectral efficiency monitor 154 enables spectral efficiency monitoring and live spectral efficiency analysis for a variety of network components and enables more efficient root cause determination. In an embodiment of the present invention, the spectral efficiency monitor 154 calculates the spectral efficiency based on UL transmitted data and DL transmitted data (in bytes) and based on shared transmission resources.

Figure 4:
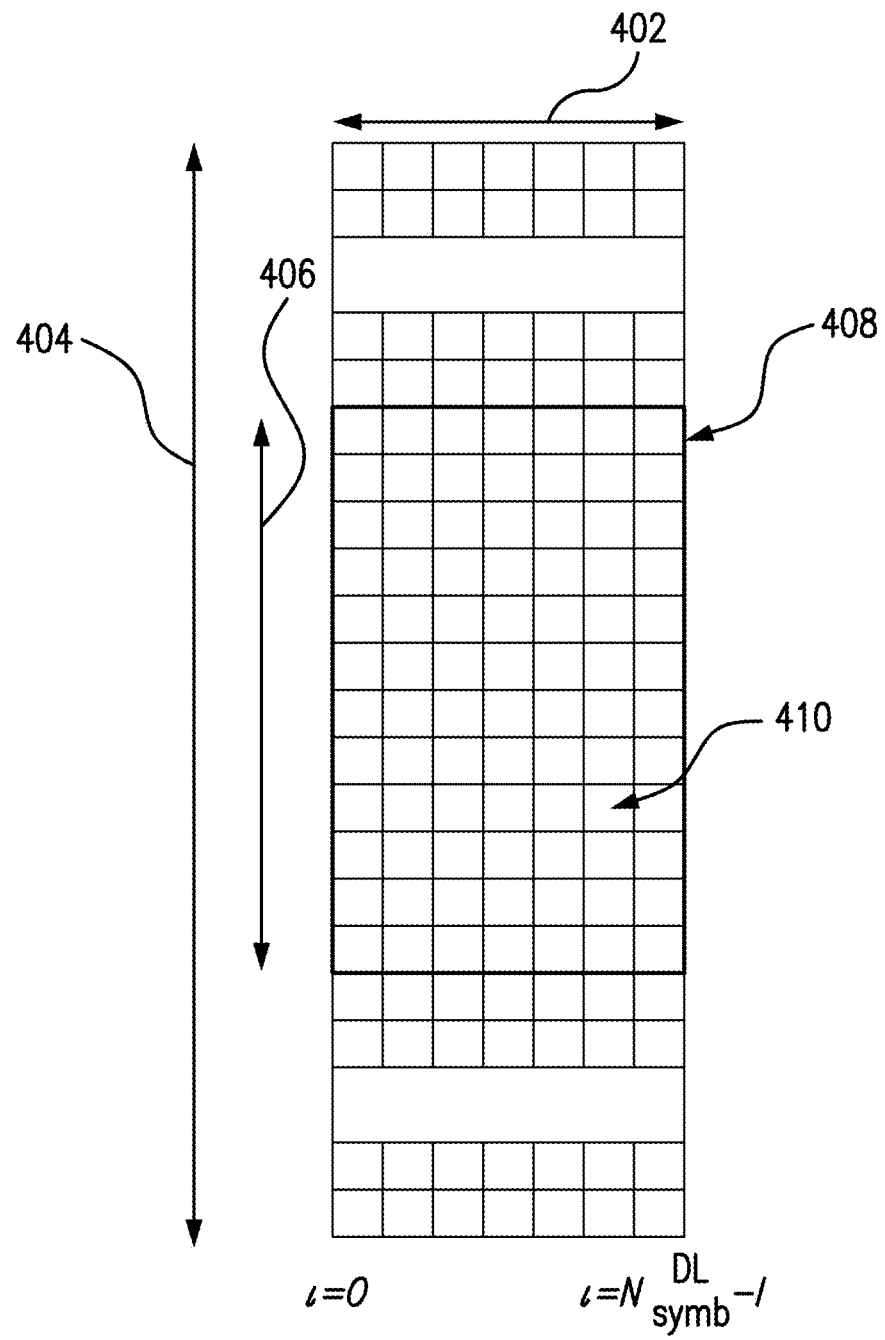
FIG. 4 illustrates an exemplary downlink transmission resource grid in accordance with an embodiment of the present invention.

FIG. 4 illustrates an exemplary downlink transmission resource grid in accordance with an embodiment of the present invention. LTE network is part of an evolved UMTS (E-UMTS) using the E-UTRA, which employs orthogonal frequency division multiple access (OFDMA) system in both downlink and uplink transmissions. The OFDMA system may use technology such as OFDM technology, SC-OFDM (single carrier-OFDM) technology, or the like. FIG. 4 illustrates a typical multicarrier OFDM system which may include a plurality of subcarriers in a carrier. For example, the number of subcarriers in a carrier may be in the range of 12 to 500 subcarriers. Carriers in a multicarrier OFDM communication system may be contiguous carriers, non-contiguous carriers, or a combination of both contiguous and non-contiguous carriers. Uplink and downlink transmissions may be separated in the frequency domain. Time slot(s) may include a plurality of OFDM symbols. The number of OFDM symbols in a slot may depend on the cyclic prefix length and subcarrier spacing.

In the example illustrated in FIG. 4, a horizontal axis 402 of the grid represents a number of OFDM symbols in a DL signal ranging from l=0 to l=$N_{symb}^{DL}$−1 and a vertical axis 404 represents a number of subcarriers ($N_{RB}^{DL} \times N_{sc}^{RB}$) ranging from k=0 to k=$N_{RB}^{DL} \times N_{sc}^{RB}$−1. FIG. 4 also shows a resource block 408 comprising a plurality ($N_{symb}^{DL} \times N_{sc}^{RB}$) of resource elements 410. $N_{RB}^{DL}$ represents a number of downlink resource blocks, $N_{sc}^{RB}$ represents a number of subcarriers per resource block, $N_{symb}^{DL}$ represents number of symbols a downlink signal slot. Axis 406 represents a number of subcarriers in the resource block 408. It should be noted that even though only a downlink transmission resource grid is shown in FIG. 4, the spectral efficiency monitor 154 could use similar uplink transmission resource grid to calculate spectral efficiency for uplink signal transmissions.

Note that in an illustrated example one time slot of 15 kHz subcarrier spacing, e.g., consisting of 7 symbols, is equivalent to two basic time slots of 30 kHz (e.g., with 14 symbols) and four basic time slots of 60 kHz (e.g., with 28 symbols), all being 0.5 ms (i.e., the sub-frame boundary alignment in terms of the smallest subcarrier spacing numerology). In other words, in this example each time slot is 0.5 ms and contains 7 OFDM symbols and each resource element has 15 kHz bandwidth. For this example, the spectral efficiency monitor 154 can calculate spectral efficiency using the following formula (1):

$$\text{Spectral efficiency (bits/s/Hz)} = \text{Data volume in bits}/(\text{Number of Resource Elements} * 15 \text{ kHz} * 0.5 \text{ ms}/7) \quad (1)$$

In an embodiment, at step 308, the spectral efficiency monitor 154 may calculate the correlation coefficients between spectral efficiency and radio measurements including, channel quality indicator (CQI), reference signal receive power (RSRP), reference signal receive quality (RSRQ), signal to interference and noise ratio (SINR), modulation and coding schemes, multiple-input, multiple-output (MIMO), and the like to find the problems in DL transmissions, from the base station 102 to the UE 104, or UL transmissions from the UE 104 to the base station 102, that cause low spectral efficiency.

Figure 5:
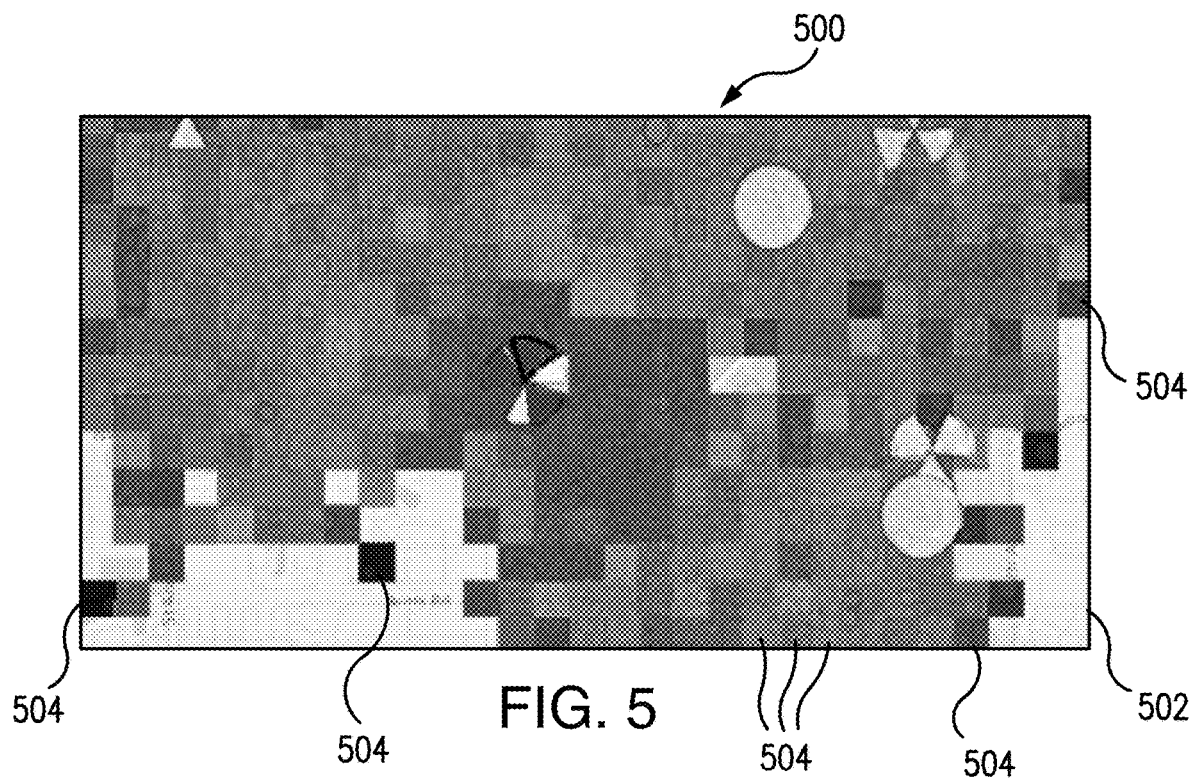
FIG. 5 illustrates an exemplary heat map generated in accordance with an embodiment of the present invention.

Referring back to FIG. 3, at step 310, the spectral efficiency monitor 154 generates a spectral efficiency map (e.g., a heat map) for one or more geolocations of interest. An exemplary heat map 500 is shown in FIG. 5. To generate the heat map 500, for each call (RRC session) the spectral efficiency monitor 154 performs geolocation of a call and assigns a geolocation descriptor (which may be numeric, e.g., latitude/longitude, or textual) to each call. Next the spectral efficiency monitor 154 generates a rectangular grid 502 associated with the geographic area of interest received from a user. The grid 502 includes a plurality of geolocation bins 504. Each geolocation bin 504 is color coded and each color represents a particular radio channel efficiency calculated by the spectral efficiency monitor 154 for all the calls in the corresponding geolocation bin 504.

In other words, to generate the heat map 500, the spectral efficiency monitor 154 maps each call into the grid 502 based on the geolocation descriptors associated with each call. After all of the calls of interest are mapped, the spectral efficiency monitor 154 examines each geolocation bin 504 on the grid 500 and computes the average value of the radio channel efficiency for all the calls that fall into that geolocation bin 504. As noted above, the spectral efficiency monitor 154 assigns a color code to each geolocation bin 504 based on the corresponding average radio channel spectral efficiency value. Thus, the color coded heat map 500 represents the geographic area of interest. In an embodiment of the present invention, if there are no calls associated with a particular geolocation bin 504, the spectral efficiency monitor 154 may leave that geolocation bin blank.

Typically, knowing spectral efficiency of a radio channel is important because the spectral efficiency is a direct indicator of how much radio channel resources (time and frequency bandwidth, or resource blocks) are required to transmit a particular amount of data, for example, one mega-byte of data.

In a typical use case, the user 158, for example an RF Engineer, may select a geographic polygon (say a rectangle) on a map using GUI module 152, for example. In response, the spectral efficiency monitor 154 will generate a radio channel efficiency heat map 500 (at step 310) for all the calls in the selected polygon for a period of time specified by the user 158, say one day. In the process of generating the heat map 500, the spectral efficiency monitor 154 selects a geolocation bin 504 size to represent the resolution of the heat map 500 (e.g., approximately 10,000 square meters). As noted above, the generated heat map 500 is color coded. In other words, the spectral efficiency of the transmission radio channel is represented by different colors in each geolocation bin 504 on the heat map 500. In one embodiment, the spectral efficiency monitor 154 may use red/orange colors to represent geographical areas that need attention (e.g., areas having poor radio channel spectral efficiency) and may use green or blue colors to represent geographical areas of high radio channel spectral efficiency. At least in some embodiments, the GUI module 152 may enable the user 158 to change either color codlings and/or geolocation bin 504 size, if desired. In response to user changes, the spectral efficiency monitor 154 may regenerate the heat map 500 accordingly. In some embodiments, the spectral efficiency monitor 154 may aggregate calculated spectral efficiency values over the selected geolocation bin 504, network element and/or device for further analysis. In some embodiments, the spectral efficiency monitor 154 may be configured to identify one or more geolocation bins where calculated spectral efficiency metric is below a predefined threshold using the generated heat map 500.

In some embodiments, the spectral efficiency monitor 154 may overlay the generated heat map 500 on a street map or a satellite map to identify the areas having poor radio channel spectral efficiency. Advantageously, once the user 158 has identified the areas of poor radio channel efficiency remedial actions may be taken to modify the wireless network configuration to improve the spectral efficiency of the radio channel for the poor performance areas. These actions may include, but are not limited to, changing antenna/radio configurations of existing sites, adding new cell sites, and the like. In some embodiments, these remedial actions may be taken automatically by the troubleshooting system 150.

Advantageously, the dynamic heat map 500 representing radio channel spectral efficiency provides additional value as compared to other wireless network cell based measurements. In a cell based analysis, the user 158 can compare the performance data of individual cells from the wireless network to optimize performance. However, a cell of the wireless communication network typically covers quite a large geographical area. A typical cell coverage area in an urban environment may have a radius of about 500 m and may cover about 120 degree sector. In contrast, the spectral efficiency monitor 154 may generate heat maps 500 having much higher resolution (e.g., a geolocation bin 504 having the size of about 50 m×50 m). The higher resolution may enable the user 158 to find answers to a variety of questions, such as, for example, whether the poor radio channel performance of a particular geolocation bin 504 is due to that bin being located in the shadow of a building.

Figure 6:
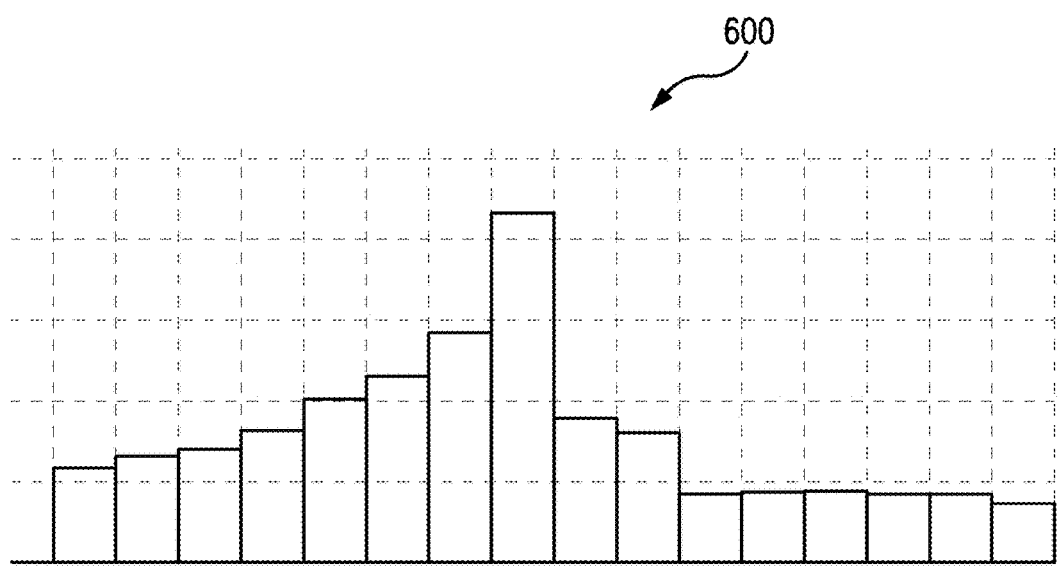
FIG. 6 illustrates an exemplary probability density function of spectral efficiency in accordance with an embodiment of the present invention.
Figure 7:
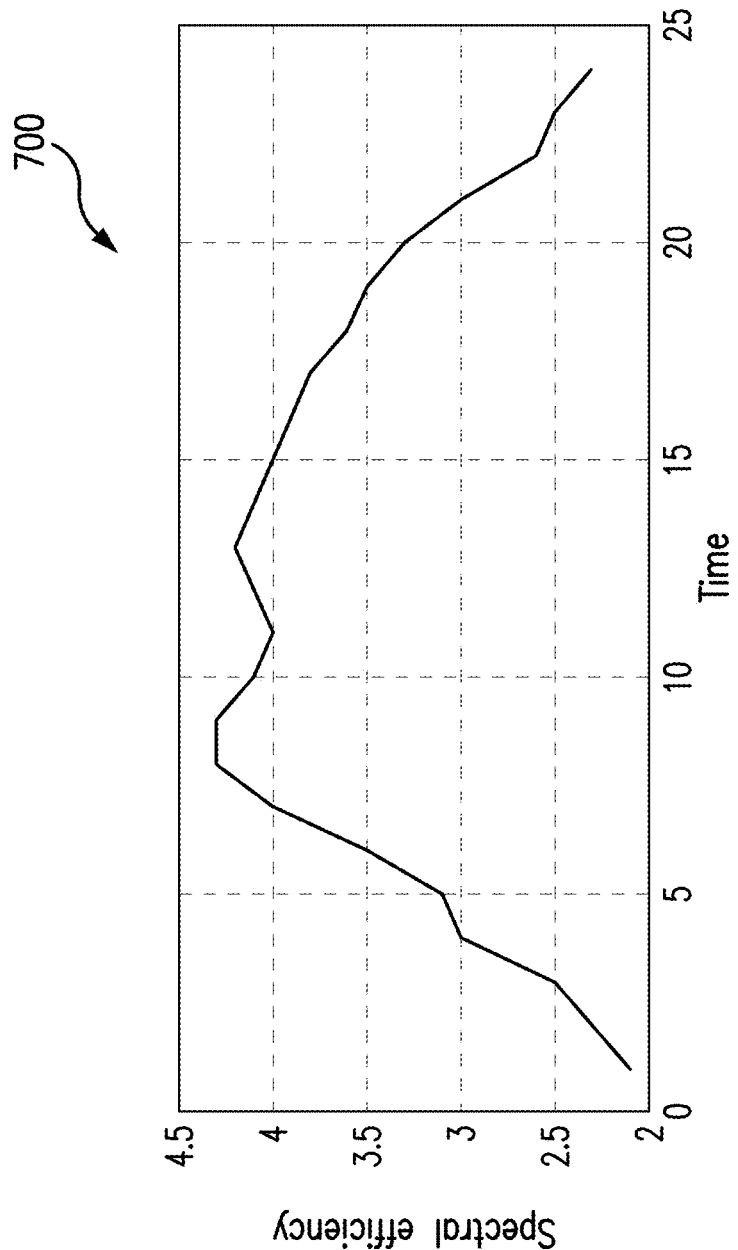
FIG. 7 illustrates time series graph of spectral efficiency in accordance with an embodiment of the present invention.

Referring back to FIG. 3, at step 312, the spectral efficiency monitor 154 may generate a histogram representing probability density function of spectral efficiency. The exemplary histogram 600 shown in FIG. 6 illustrates a spectral pattern that is representative of the distribution of spectral efficiency of the transmission radio channel. At step 314, the spectral efficiency monitor 154 may also generate a time series graph of spectral efficiency. The spectral efficiency monitor 154 may utilize an average of a time series of values for a given geolocation bin 504 to generate a time series graph 700 shown in FIG. 7. The horizontal axis of the time series graph 700 depicts time corresponding to the given time period and the vertical axis of the time series graph depicts spectral efficiency values. In some embodiments, the spectral efficiency monitor 154 may identify one or more time periods within the given time period during which the calculated spectral efficiency metric is below a predefined threshold using the generated time series graph 700.

FIG. 8 graphically illustrates the performance of a particular exemplary base station (eNodeB) in a cellular network. FIG. 8 shows a cumulative distribution function (CDF) of overall base station performance for both UL and DL signals that may be calculated by the spectral efficiency monitor 154. In FIG. 8, a first graph 802 illustrates the CDF of a DL signal and a second graph 804 illustrates the CDF of an UL signal. As noted above, in some embodiments, the spectral efficiency monitor 154 may be configured to correlate the calculated spectral efficiency of a radio signal with one or more radio measurements. By performing such correlation, the spectral efficiency monitor 154 may determine, for example, that lower spectral efficiency in the DL signal 802 as compare to the UL signal 804 is due to lower order modulation in DL signal because of lower CQI, for example.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for monitoring spectral efficiency in a wireless network, the method comprising steps of:
    determining total number of resource blocks or resource elements allocated for each of one or more calls in the wireless network during a given time period and determining a corresponding total number of bits transmitted for each of the one or more calls during the given time period;
    calculating a spectral efficiency metric for each of the one or more calls based at least in part on the total number of bits transmitted during the given time period and the total number of resource blocks or resource elements allocated for transmission during the given time period, wherein the spectral efficiency is calculated in both uplink (UL) and downlink (DL) signals based at least in part on transmitted data volume and a number of allocated physical resource elements associated with each of the one or more calls whereby a set of physical resource blocks are allocated by an eNodeB from the wireless network to carry uplink/downlink user data information and uplink/downlink control information;
    generating a heat map for each of the one or more calls based on geographic locations of the one or more calls wherein the heat map includes a plurality of geolocation bins with each geolocation bin being distinguished by indicia indicating the calculated spectral efficiency for the geographic location associated with that geolocation bin such that after all calls of interest are mapped in the heat map, the average value for the radio channel efficiency for all calls for a geolocation bin is determined wherein each geolocation bin is color coded such that a particular color represents a particular radio channel calculated spectral efficiency for calls located in that geolocation bin and wherein the calculated spectral efficiency values is aggregated over a user selected geolocation bin;
    identifying one or more time periods within the given time period during which the calculated spectral efficiency metric is below a predefined threshold using the generated graph; and
    correlating the calculated spectral efficiency metric with one or more data channel quality indicators associated with the one or more calls and associated with the identified one or more time periods during which the calculated spectral efficiency is below the predefined threshold.

2. The method of claim 1, further comprising:
    generating a graph of time series data values for the calculated spectral efficiency metric, the generated graph having a time axis corresponding to the given time period and having a spectral efficiency axis; and
    generating a probability density function of the calculated spectral efficiency metric for each of the one or more calls.

3. The method of claim 1, further comprising identifying one or more geographic location bins where calculated spectral efficiency metric is below a predefined threshold using the generated heat map and wherein the one or more calls comprise live data sessions and live voice calls.

4. The method of claim 1, further comprising identifying one or more root causes of the calculated spectral efficiency metric being below the predefined threshold based on the performed correlation.

5. The method of claim 1, wherein the step of calculating the spectral efficiency metric further comprises calculating an uplink spectral efficiency metric for an uplink signal associated with each of the one or more calls and calculating a downlink spectral efficiency metric for a downlink signal associated with each of the one or more calls.

6. A system for monitoring spectral efficiency in a wireless network, the system comprising:
    a processor and a memory device coupled to the processor, the memory device containing a set of instructions that, when executed by the processor, cause the processor to:
        determine total number of resource blocks or resource elements allocated for each of one or more calls in the wireless network during a given time period and determine a corresponding total number of bits transmitted for each of the one or more calls during the given time period;
        calculate a spectral efficiency metric for each of the one or more calls based at least in part on the total number of bits transmitted during the given time period, wherein the spectral efficiency is calculated in both uplink (UL) and downlink (DL) signals based at least in part on transmitted data volume and a number of allocated physical resource elements associated with each of the one or more calls whereby a set of physical resource blocks are allocated by an eNodeB from the wireless network to carry uplink/downlink user data information and uplink/downlink control information; and
        generate a heat map for each of the one or more calls based on geographic locations of the one or more calls wherein the heat map includes a plurality of geolocation bins with each geolocation bin being distinguished by indicia indicating the calculated spectral efficiency for the geographic location associated with that geolocation bin such that after all calls of interest are mapped in the heat map, the average value for the radio channel efficiency for all calls for a geolocation bin is determined wherein each geolocation bin is color coded such that a particular color represents a particular radio channel calculated spectral efficiency for calls located in that geolocation bin and wherein the calculated spectral efficiency values is aggregated over a user selected geolocation bin;
        identify one or more time periods within the given time period during which the calculated spectral efficiency metric is below a predefined threshold using the generated graph; and
        correlate the calculated spectral efficiency metric with one or more data channel quality indicators associated with the one or more calls and associated with the identified one or more time periods during which the calculated spectral efficiency is below the predefined threshold.

7. The system of claim 6, wherein the set of instructions that, when executed by the processor, further cause the processor to generate a probability density function of the calculated spectral efficiency metric for each of the one or more calls and wherein one or more calls comprise live data sessions and live voice calls.

8. The system of claim 6, wherein the set of instructions that, when executed by the processor, further cause the processor to generate a graph of time series data values for the calculated spectral efficiency metric, the generated graph having a time axis corresponding to the given time period and having a spectral efficiency axis.

9. The system of claim 6, wherein the set of instructions that, when executed by the processor, further cause the processor to:
identify one or more geographic location bins where calculated spectral efficiency metric is below a predefined threshold using the generated heat map; and
identify one or more time periods within the given time period during which the calculated spectral efficiency metric is below a predefined threshold using the generated graph.

10. The system of claim 6, wherein the set of instructions that, when executed by the processor, further cause the processor to correlate the calculated spectral efficiency metric with one or more data channel quality indicators associated with the one or more calls and associated with the identified one or more time periods during which the calculated spectral efficiency is below the predefined threshold.

11. The system of claim 10, wherein the set of instructions that, when executed by the processor, further cause the processor to identify one or more root causes of the calculated spectral efficiency metric being below the predefined threshold based on the performed correlation.

12. The system of claim 6, wherein the set of instructions that, when executed by the processor, cause the processor to calculate the spectral efficiency metric further cause the processor to calculate an uplink spectral efficiency metric for an uplink signal associated with each of the one or more calls and calculate a downlink spectral efficiency metric for a downlink signal associated with each of the one or more calls.

13. A tangible, non-transitory, computer-readable media having software encoded thereon, the software, when executed by a processor, operable to:
determine total number of resource blocks or resource elements allocated for each of one or more calls in the wireless network during a given time period and determine a corresponding total number of bits transmitted for each of the one or more calls during the given time period;
calculate a spectral efficiency metric for each of the one or more calls based at least in art on the total number of bits transmitted during the given time period and the total number of resource blocks or resource elements allocated for transmission during the given time period, wherein the spectral efficiency is calculated in both uplink (UL) and downlink (DL) signals based at least in part on transmitted data volume and a number of allocated physical resource elements associated with each of the one or more calls whereby a set of physical resource blocks are allocated by an eNodeB from the wireless network to catty uplink/downlink user data information and uplink/downlink control information; and;
generate a heat map for each of the one or more calls based on geographic locations of the one or more calls wherein the heat map includes a plurality of geolocation bins with each geolocation bin being distinguished by indicia indicating the calculated spectral efficiency for the geographic location associated with that geolocation bin such that after all calls of interest are mapped in the heat map, the average value for the radio channel efficiency for all calls for a geolocation bin is determined wherein each geolocation bin is color coded such that a particular color represents a particular radio channel calculated spectral efficiency for calls located in that geolocation bin and wherein the calculated spectral efficiency values is aggregated over a user selected geolocation bin;
identify one or more time periods within the given time period during which the calculated spectral efficiency metric is below a predefined threshold using the generated graph; and
correlate the calculated spectral efficiency metric with one or more data channel quality indicators associated with the one or more calls and associated with the identified one or more time periods during which the calculated spectral efficiency is below the predefined threshold.

14. The computer-readable media of claim 13, wherein the software, when executed by the processor, further cause the processor to generate a probability density function of the calculated spectral efficiency metric for each of the one or more calls.

15. The method as recited in claim 1, wherein calculating the spectral efficiency metric for each of the one or more calls further includes calculating correlation coefficients between spectral efficiency and radio measurements.

16. The method as recited in claim 15, wherein calculating the spectral efficiency metric further includes calculating one of channel quality indicator, reference signal power reserve, reference signal receive quality, signal to interference and noise ratio, and modulation and coding schemes.

17. The system as recited in claim 6, wherein calculating the spectral efficiency metric for each of the one or more calls further includes calculating one of correlation coefficients between spectral efficiency and radio measurements.

18. The system as recited in claim 17, wherein calculating the spectral efficiency metric further includes calculating one of channel quality indicator, reference signal power reserve, reference signal receive quality, signal to interference and noise ratio, and modulation and coding schemes.

* * * * *